Nov. 28, 1967 C. H. CHRISTIANSEN 3,355,631

REMOVABLE KEY ACTUATED CONTROL CIRCUIT

Filed May 6, 1964 2 Sheets-Sheet 1

INVENTOR.
Carl Henry Christiansen

BY Hill, Sherman, Meroni, Gross & Simpson
ATTORNEYS

REMOVABLE KEY ACTUATED CONTROL CIRCUIT

Filed May 6, 1964 2 Sheets-Sheet 2

INVENTOR.
Carl Henry Christiansen
BY
Hill, Sherman, Meroni, Gross & Simpson
ATTORNEYS 3,355,631

REMOVABLE KEY ACTUATED CONTROL CIRCUIT

Carl H. Christiansen, Chicago, Ill., assignor of fifty percent to Raymond E. Dolac, Niles, Ill.

Filed May 6, 1964, Ser. No. 365,463
11 Claims. (Cl. 317—134)

ABSTRACT OF THE DISCLOSURE

A removable key actuating control circuit having a plurality of stagger tuned tank circuits which are connected to an oscillator. Each of the inductances of the tank circuits are wound on a common hollow cylinder and fixedly positioned relative to one another. A key having a rod-like extension which is formed of alternate types of material is provided to be inserted into the cylinder to effect the inductance of each of the coils independently so as to cause the tank circuit associated with each of the coils to be placed in resonance with the frequency of the oscillator circuit. This action develops a control signal which actuates a switching device to energize, for example, an electromagnetic locking mechanism.

This invention relates generally to key controlled systems and more specifically to electronic lock and key systems wherein the key is free from electronic components and contacts.

According to the present invention, a key can be constructed in such a manner as to make duplication thereof by unauthorized persons virtually impossible or at least highly impractical. Also, my invention provides means affording a wide range of predeterminable matching and tuning variables enabling the provision of individual key controlled circuits which are sufficiently different from each other so that no circuit can be controlled by other than its own key.

An object of this invention is to provide a novel key controlled electronic system which is adapted to be constructed in small compact sizes, is efficient in operation and inexpensive to manufacture, and has utility in numerous applications.

Another object of this invention is to provide an improved electronic locking system which will energize an electromagnetic lock when the key is inserted into the electronic locking system, and will deenergize the electromagnetic lock when the key is moved from the electronic locking system.

Another object of this invention is to provide a new and improved key operated electronic system which will become alternately energized and deenergized when a matching key is successively inserted into the system.

A further object of this invention is to provide an electronic switching system which can be switched only by authorized persons having possession of the appropriate key.

Other objects, features and advantages will become more apparent from the study of the following specifications and drawings in which.

Figure 1:
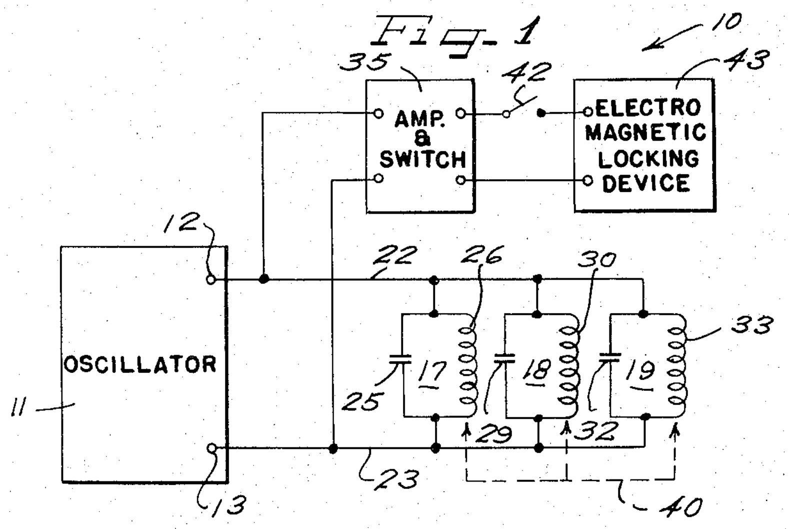
FIGURE 1 is a schematic block diagram showing the arrangement of a plurality of resonant circuits used in accordance with this invention.

Although the invention is adapted for use in controlling any apparatus or device subject to control by a key operated system, for illustrative purposes it is herein shown as applied to an electronic locking system (FIGURE 1) being generally designated by reference numeral 10. An oscillator 11 has a pair of terminals 12 and 13 to which the oscillator signal is applied. A plurality of parallel resonant tank circuits 17, 18 and 19 are connected to the terminals 12 and 13 through lines 22 and 23, respectively. The parallel resonant circuit 17 has a capacitor 25 and an inductor 26 the values of which will cause the resonant frequency thereof to be greater than the frequency of the oscillator 11. The resonant circuit 18 has a capacitor 29 and an inductor 30, the values of which will cause the resonant frequency thereof to be greater than the frequency of the oscillator and less than the resonant frequency of the circuit 17. The resonant circuit 19 has a capacitor 32 and an inductor 33, the values of which will have a resonant frequency less than the frequency of the oscillator 11.

The parallel resonant circuits 17–19 are constructed in such a manner as to obtain a quality of factor which is very high, thereby providing a high impedance to their resonant frequency and providing a low impedance to all frequencies other than their resonant frequency. Also, connection of the resonant circuits 17–19 is in parallel, thereby requiring that all of the resonant circuits be resonant to the same frequency to provide a high impedance thereto. As mentioned hereinabove, the quality factor of the resonant circuits 17–19 is sufficiently high to cause a rapid change in impedance when the resonant frequency applied thereto deviates a small amount either above or below the resonant frequency of the circuit. Therefore, the circuits 17–19 when tuned to a resonant frequency other than the frequency of the oscillator 11 will cause the oscillator frequency to be shunted through one or more of the circuits 17–19. When all the circuits 17–19 are tuned to a resonant frequency equal to the frequency of the oscillator 11 a high impedance will be offered therefrom to terminals 12 and 13 thereby applying the oscillator signal to an amplifier 35.

According to an important feature of this invention, the tuned circuits 17–19 will render the output from the oscillator 11 ineffective to the amplifier 35 until a key represented at 40 is placed in proximity with the inductors 26, 30 and 33. This action will cause the resonant frequency of the circuits 17–19 to be equal to the frequency of the oscillator 11, and, in turn, will cause the amplifier 35 to amplify the oscillator signal and close the switch 42, which will actuate the electromagnetic locking device 43.

Although the electronic locking system in FIGURE 1 is shown having three parallel resonant circuits it can be seen that one parallel resonant circuit will work, however, two or more are required to provide a combination which is usable as a locking system.

The resonant frequency of the circuits 17–19 can be determined either by varying the value of the capacitors 25, 29 and 32 or by varying the inductance of the inductors 26, 30 and 33. In accordance with this invention, it has been chosen to provide inductors in a predetermined spaced relation with respect to each other and having different inductances to cause different resonant frequencies of each circuit.

Figure 2:
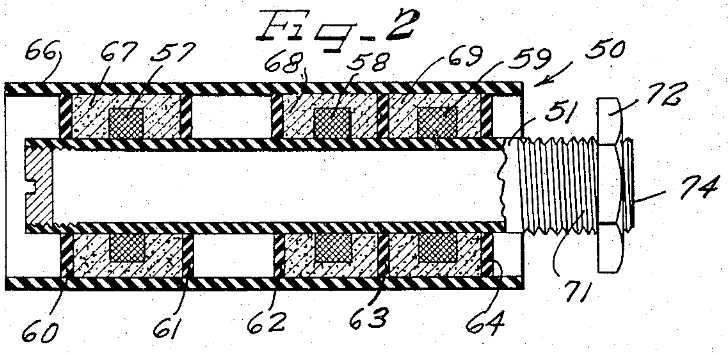
FIGURE 2 is a sectioned view of a key receptacle having a multiplicity of inductors located about a common core and is constructed in accordance with this invention.

As shown in FIGURE 2, a key receptacle designated generally by reference numeral 50 has a hollow core 51, which is opened at one end thereof to receive a key, described hereinbelow. A ward 54 is inserted in the other end of the hollow core 51. A plurality of coils 57–59 are wound about the core 51 and have disposed between them insulators 60–64. A cylindrical shell 66 is placed about the insulators 60–64 to form chambers 67–69 about the coils 57–59.

The inductance of the coils 57–59 is predetermined by the number of turns of wire on each coil, the gauge of the wire and by a compound having either a predetermined number of ferrous particles or a predetermined number of non-ferrous particles. By way of example, and not by way of limitation, the coils 57–59 can be identically wound and having similar inductances in free air, however, by changing the density of the particles in the compound and/or by changing the type of particles in the compound a different inductance will be obtained from each coil 57–59 when placed in their respective chambers 67–69 and surrounded by a compound having a predetermined ferrous or non-ferrous characteristic.

The core 51 is provided with a threaded portion 71 to which a nut 72 is threaded thereon. Also, the ward 54 has a threaded portion for adjustment in the core 51 to provide a predetermined optimum depth from the opening 74 to the face portion of the ward 54.

Figure 3:
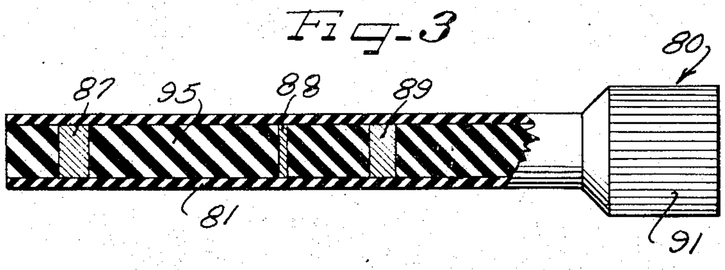
FIGURE 3 is a somewhat sectioned view of a key having a multiplicity of slugs for insertion into the key receptacle of FIGURE 2 and is constructed in accordance with this invention.

A key generally designated by reference numeral 80 is shown in FIGURE 3. A hollow shaft portion 81 has located therein a plurality of slugs 87–89, which are in a similar spaced relation to the coils 57–59. The materials of the slugs 87–89 can be of a large variety of stuffs, and the slugs 87–89 can have a large variety of shapes and sizes, thereby providing an infinite number of combinations which can be attained to provide many keys of different character.

By way of example, the slug 87 can be soft iron and having a given mass, while the slug 88 is also of soft iron and having a lesser mass, and still further the slug 89 can be of copper having a mass equal to the slug 87. When the key 80 is inserted into the key hole 74, and the slugs 87–89 alinged with the coils 57–59, the inductances of the coils 57–59 will be of equal value thereby causing the output of the oscillator 11 to be applied to the amplifier 35 and actuate the switch 42, as shown in FIGURE 1. It can be seen, therefore, that if the key 80 is removed halfway from the receptacle 50 the inductances of the coils 57–59 will be effected thereby changing the resonant frequency of the circuits 17–19. Also, if a key not having the exact configuration as the key 80 is inserted into the key hole 74 it will have no effect on the output of the oscillator 11, because, only one predetermined combination of slugs and coil configuration will be compatible with each other. The slugs 87–89 may also be of a compound placed in chambers of various volumes in the shaft 81. This further extends the utility of the key 80 as having many combinations which are not duplicatable by unauthorized persons.

The key 80 has a grip portion 91, which also serves to alleviate confusion as to which end of the key should be placed into the key hole 74. An epoxy filler material 95 is used to hold the slugs 87–89 in their exacting predetermined positions thereby preventing accidental shifting of the slugs which would render the key useless in such an event.

Figure 4:
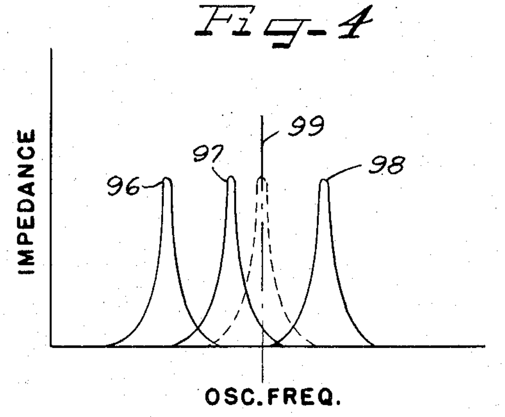
FIGURE 4 is a graphical representation of the impedance and various resonant conditions of the resonant circuits shown in FIGURE 1.

FIGURE 4 is a graphical representation of the relative positions of the high impedance characteristic of the coils 57–59. By way of example, the curve 96 represents the position of the high impedance of coil 57, which is resonant at a frequency above the frequency of the oscillator 11. The curve 97 represents the position of the high impedance of the coil 58, which is resonant at a frequency above the frequency of the oscillator 11, but resonant at a frequency lower than the resonant frequency of the coil 57. The curve 98 represents the high impedance portion of the coil 59, which is resonant at a frequency lower than the frequency of the oscillator 11, and lower than the resonant frequency of the coils 57 and 58. The line 99 represents the frequency at which the oscillator 11 is operating and also shows the impedance on the curves 96–98. The criticality of the position of the impedance curves 96–98 is proportional to the quality factor of the circuits 17–18, FIGURE 1, and it is therefore considered that the higher the quality factor the more critical the position of the key 80 is in respect to the position of the coils 57–59. Therefore, the ward 54 can be adjusted so that when the key 80 is inserted into the receptacle 50 it will effect the inductance of the coils 57–59 simultaneously when the end of the shaft 81 is rested against the ward 54.

As mentioned hereinabove, the slug 87 is of soft iron and having a mass sufficient to decrease the resonant frequency of the circuit 17, which is associated with the coil 57, to equal the frequency of the oscillator 11. The slug 88 is also of soft iron but having a mass less than the slug 87 which is sufficient to change the resonant frequency of the circuit 18, which is associated with the coil 58, to equal the frequency of the oscillator 11. The slug 89 is made of copper and having a mass sufficient to increase the resonant frequency of the circuit 19, which is associated with the coil 59, to the frequency of the oscillator 11. When the resonant frequency of all the circuits 17–19 is equal to the frequency of the oscillator 11 the oscillator signal will be applied to the amplifier 35.

Figure 5:
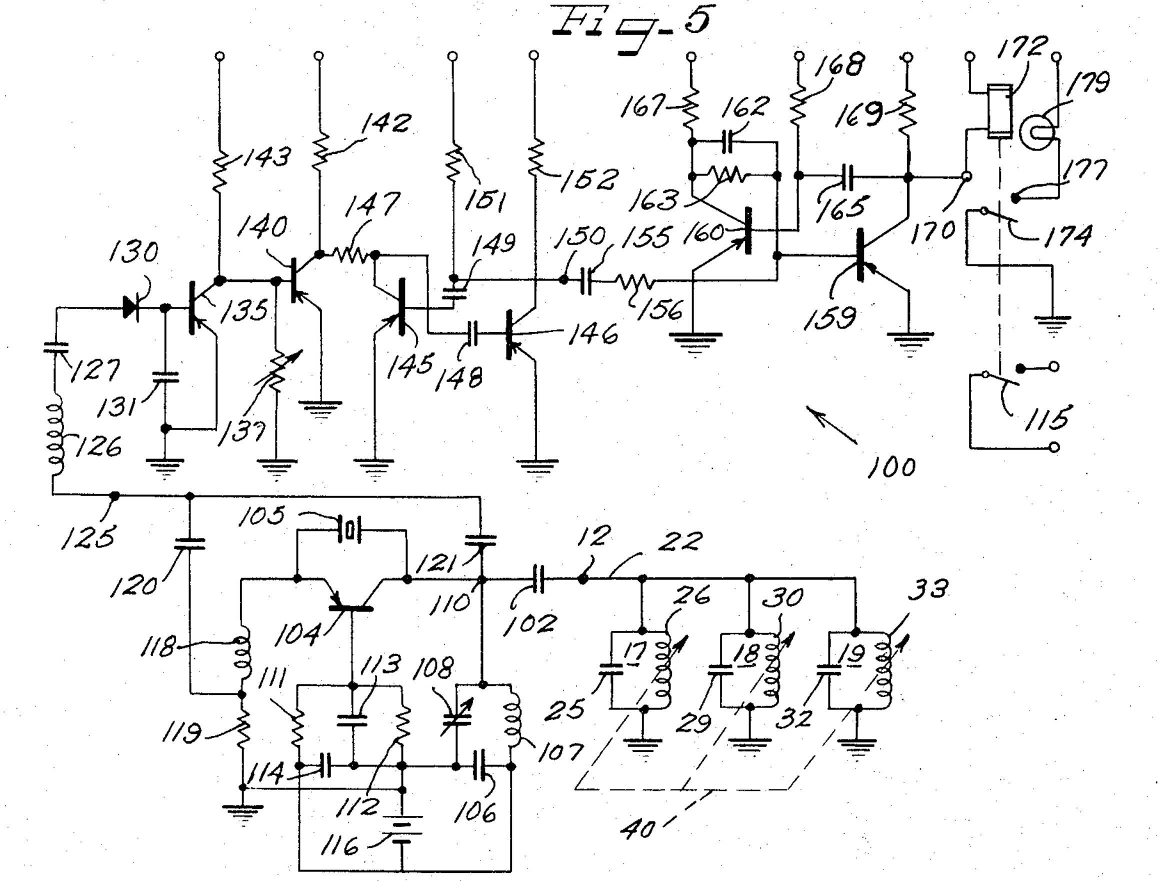
FIGURE 5 is a schematic diagram showing a multiplicity of resonant circuits and associated components constructed in accordance with the principles of this invention.

A detailed schematic of the electronic locking system is shown in FIGURE 5 and is designated generally by reference numeral 100. The plurality of parallel resonant circuits 17–19 are connected to the line 22 and therefrom to the terminal 12, which is connected to an output and isolation capacitor 102. A transistor 104 has an oscillatory crystal 105 connected to the emitter and collector thereof. A resonant circuit comprised of a capacitor 106 and inductor 107 and a variable capacitor 108 is provided in the collector circuit of the transistor 104 to provide maximum impedance at the oscillator frequency thereby developing an oscillator signal at terminal point 110. A pair of resistors 111 and 112, and a pair of capacitors 113 and 114 are connected in the base circuit of the transistor 104 and to a battery 116. An inductor 118 and a resistor 119 are connected to a capacitor 120 and constitute a feed back circuit from the output capacitor 121. An output terminal 125 of the oscillator 11 has connected thereto an inductor 126 and a capacitor 127 which form a series resonant circuit at the frequency of the oscillator. thereby opposing all other frequencies.

A diode 130 has one end thereof connected to the base of the transistor 135 and the capacitor 131 and serves as a detector to eliminate half of the oscillator frequency and apply a negative signal to the base of the transistor 135, and the other end thereof is connected to capacitor 127. A variable resistor 137 is connected to the collector of the transistor 135. The variable resistor 137 is a sensitivity control which can be adjusted to render the transistor 135 conductive when a desired signal is received at the base thereof.

The transistor 140 is directly coupled to the transistor 135 through a resistor 141 and is connected to a negative supply voltage through a resistor 142. The collector of the transistor 135 is also connected to the negative supply voltages through a resistor 143.

A free-running multivibrator having a pair of transistors 145 and 146 is connected to the amplifier transistor 140 through a resistor 147. The capacitor 148 is connected between the base of the transistor 146 and the collector of the transistor 145, while a capacitor 149 is connected between the base of the transistor 145 and the output terminal 150. A pair of resistors 151 and 152 are connected to the capacitor 149 and the transistor 146 respectively.

The output of the free-running multivibrator is then applied to a capacitor 155 and a resistor 156 and therefrom to the base electrode of a transistor 159. The transistor 159 and the transistor 160 constitute a monostable multivibrator having a recycle of .1 second.

A parallel circuit comprising capacitor 162 and resistor 163 is connected between the collector electrode of the transistor 160 and the base electrode of the transistor 160 and the base electrode of the transistor 159. A capacitor 165, which determines the recycle frequency of the monostable multivibrator, is connected between the collector electrode of the transistor 159 and the base electrode of the transistor 160. A resistor 167 is connected to the collector electrode of the transistor 160 and to negative power supply. A resistor 168 is connected to the capacitor 165 and the base electrode of the transistor 160, while a resistor 169 is connected to the other end of the capacitor 165 and to the collector electrode of the transistor 159.

By way of example, and not by way of limitation, the frequency of the free-running multivibrator, which is comprised of transistors 145 and 146, is 1,000 cycles per second, It can be seen therefore that one output pulse from the free-running multivibrator applied to the base of the transistor 159 will render the transistor 159 conductive until such time that the capacitor 165 is charged thereby rendering the transistor 159 nonconductive. However, the time which the transistor 159 is nonconductive is only .001 second if the free-running multivibrator is still operating because of signals received from the oscillator circuit 11. This action will cause an almost pure DC output signal to appear at the terminal 170 as long as the circuits 17–19 are resonant to the frequency of the oscillator 11.

A relay 172 is connected between the terminal 170 and the negative power supply and is energized when the transistor 159 is rendered conductive. When the relay 172 is energized contactors 174 and 175 will be actuated to complete the circuit of associated components. The contactor 174, when engaged with contact 177, will apply power to an indicating lamp 179 thereby indicating the condition of the electronic locking system, in this instance showing that the key 80 is inserted into the receptacle 50. The contact 175 is used to energize an appropriate electromagnetic walking device (not shown).

The relay 172 can be of the ratchet type requiring a first energizing signal to actuate the contactors 174 and 175, and then requiring a second energizing signal to deactuate the contactors 174 and 175. This type of relay will enable the user of the key to remove the key from the receptacle after energizing the electromagnetic lock and will require the user to insert the key back into the receptacle to deactuate the electromagnetic lock thereby locking the system. Also, the relay 172 could be replaced by a suitable bistable multivibrator or a flip-flop circuit to obtain the same results.

*Summary of operation*

The electronic locking system 10, shown in FIGURE 1, has a plurality of parallel tuned circuits 17–19 which are connected in parallel and to the output terminals 12 and 13 of the oscillator 11. The quality factor of the resonant circuits 17–19 is relatively high thereby giving a sharp rise and fall to the impedance curve at the resonant frequencies thereof. When one of the circuits 17–19 is detuned a sufficient amount from the frequency of the oscillator 11 the impedance in that circuit will be low thereby shunting the signal from the oscillator 11. When all the circuits are tuned to the oscillator frequency a signal is applied to amplifier 35 which in turn will actuate the switch 42 to energize the electromagnetic locking device 43. The inductors 26, 30 and 33, which correspond to the coils 57, 58 and 59, respectively in FIGURE 2, are wound on a common hollow shaft and have a predetermined spaced relation with each other. The circuits 17–19 are tuned to the oscillator frequency when a key 40 is placed in proximity therewith, thereby allowing the oscillator signal to be applied to the amplifier 35.

To accomplish the simultaneous tuning of the circuits 17–19 to the resonant frequency of the oscillator frequency a key 80, having a plurality of slugs, is inserted into a key receptacle 50 in a manner as to align the slugs of the key with the coils in the key receptacle. It can be seen therefore that if one of the slugs 87–89 is removed or not in the exact position required the corresponding coil 57–59 will remain detuned thereby keeping the system in a locked state.

Although the description of this invention has been given with respect to a particular embodiment, it is not to be construed in a limiting sense. Therefore, the foregoing description of this invention concerns only the preferred embodiment thereof, and that accordingly changes and modifications may be made therein by those skilled in the art without departing from the spirit and scope of the novel concepts of this invention.

I claim as my invention:

1. An electronic control system of the character described adapted for operating an electromagnetic lock, comprising, an oscillator having output terminals for receiving a signal therefrom, a plurality of parallel detuned circuits connected to said output terminals for shunting the oscillator signal, an inductor in each of said parallel detuned circuits, said inductor in each of said parallel detuned circuits being in a predetermined spaced relation with respect to each other inductor in each of their respective parallel detuned circuits, a key of insulating material having a plurality of slugs in a predetermined spaced relation to be placed in proximity to said inductors for effecting a change in their respective inductances, and means connected to said output terminals of said oscillator for operating the electromagnetic lock in response to changes in inductance of said inductors.

2. An electronic locking system of the character described for operating an electromagnetic lock, comprising an oscillator having output terminals for receiving a signal therefrom, a plurality of parallel detuned circuits connected to said output terminals for shunting the oscillator signal, an inductor in each of said parallel detuned circuits, said inductors wound in spaced relation on a common hollow tube having an opening at one end thereof, a key having a plurality of slugs in a predetermined spaced relation for insertion in the opening of said hollow tube thereby placing said slugs in proximity to said inductors to effect a change in their respective inductances, and means connected to said output terminals of said oscillator for operating said electromagnetic lock in response to changes in inductance of said inductors.

3. In a system for operation by a key comprising, an oscillator having output terminals for receiving a signal therefrom, a plurality of circuits connected in parallel and connected to said output terminals for shunting the oscillator signal, said circuits each having a capacitor and inductor, said inductor of each of said circuits wound in a chamber on a common hollow core having an opening at one end thereof to form a key opening, a compound having a predetermined density of ferrous material for surrounding a predetermined number of inductors, a key having a shaft portion at one end thereof for insertion into the key opening of said core, a plurality of slugs in said shaft portion of said key so spaced as to effect the inductance of a corresponding inductor on said core, and switch means including a detector and amplifier connected to said output terminals of said oscillator for actuation when said key is in said key opening and for deactuation when said key is removed from said key opening.

4. The system of claim 3 in which each one of the plurality of slugs in said hollow shaft portion of said key are of different material.

5. The system of claim 3 in which each one of the plurality of slugs in said hollow shaft portion of said key are of different sizes.

6. In a system for operation by a key comprising, an oscillator having output terminals for receiving a signal therefrom, a plurality of circuits connected in parallel and connected to said output terminals for shunting the oscillator signal, said circuits each having a capacitor and inductor, said inductor of each of said circuits wound in a chamber on a common hollow core having an opening at one end thereof to form a key opening, a compound having a predetermined density of ferrous material for surrounding a predetermined number of inductors, a key having a shaft portion at one end thereof for insertion into the key opening of said core, a plurality of slugs in said shaft portion to said key so spaced as to effect the inductance of a corresponding inductor on said core, and switch means including a detector and amplifier connected to said output terminals of said oscillator for actuation when said key is inserted into said key opening a first time and for deactuation when said key is inserted into said key opening a second time.

7. The system of claim 6 including indicating means for visual indication of the condition of said switch means.

8. An electronic locking system of the character described for operating an electromagnetic lock, comprising, an oscillator having output terminals for receiving a signal therefrom, a plurality of detuned circuits at least two of which are detuned different from said oscillator frequency and detuned different from each other, said detuned circuits connected in parallel and connected to said output terminals of said oscillator, an inductor in each of said parallel detuned circuits, said inductor in each of said parallel detuned circuits being in a predetermined spaced relation with respect to each other inductor in each of their respective parallel detuned circuits, a key having a plurality of slugs for tuning respective ones of said detuned circuits when said key is placed in proximity of said inductors thereby causing a control signal when all detuned circuits are tuned, and means connected to said output terminals of said oscillator for operating said electromagnetic lock in response to said control signal.

9. In a system for operation by a key comprising, an oscillator having output terminals for receiving a signal therefrom, a plurality of resonant circuits at least one of which is resonant to a frequency higher than said oscillator frequency and at least one of which is resonant to a frequency lower than said oscillator frequency, said resonant circuits connected to said output terminals of said oscillator, an inductor in each of said resonant circuits, said inductor of each of said circuits wound in a chamber on a common hollow core having an opening at one end thereof to form a key opening, a compound having a predetermined density of ferrous material for surrounding a predetermined number of inductors, a key having a shaft portion at one end thereof for insertion into the key opening of said core, a plurality of slugs in said shaft portion of said key so spaced as to effect the inductance of a corresponding inductor on said core, each of said slugs composed of material sufficient to cause all of said circuits to become resonant at said oscillator frequency when said key is inserted into said key opening thereby producing a control signal at said output terminal of said oscillator, and switch means including a detector and amplifier connected to said output terminals of said oscillator for actuation when said key is in said key opening and for deactuation when said key is removed from said key opening.

10. An electronic locking system for operating an electromagnetic lock comprising, an oscillator, a plurality of parallel resonant circuits at least two of which are resonant at a different frequency than said oscillator and at different frequencies from each other, means for connecting said resonant circuits in parallel, and for connecting said circuits to said oscillator, said resonant circuits having a minimum impedance when resonant at a frequency other than the frequency of said oscillator, an inductor in each of said parallel resonant circuits, said inductor of each of said circuits wound in a chamber on a common hollow core having an opening at one end thereof to form a key opening, a key having a shaft portion at one end thereof for insertion into the key opening of said core, a plurality of slugs in said shaft portion of said key, each of said slugs being of a material and having a shape to cause all of said circuits to become resonant at said oscillator frequency when said key is inserted into said key opening thereby causing maximum impedance of said resonant circuits to produce a signal at said output terminals of said oscillator, and switch means including a detector and amplifier connected to said output terminals of said oscillator for actuation when said key is in said key opening and for deactuation when said key is removed from said key opening.

11. An electronic locking system comprising:

oscillatory means having output terminals for developing a signal of predetermined frequency;

a plurality of circuits connected in parallel with said output terminals, each circuit including capacitor means and inductor means connected together to form resonance circuits at a frequency different than said predetermined frequency, said inductor means of each of said circuits being in a predetermined spaced relation with respect to each other inductor means;

a key having a plurality of slugs in predetermined spaced relation to be placed in proximity to said inductor means for effecting a change in their respective inductance;

and means coupled to said output terminals for energization by the oscillatory means when said key is in proximity to said inductor means.

References Cited

UNITED STATES PATENTS

| | | | |
|---|---|---|---|
| 2,541,461 | 2/1951 | Churchill | 317—134 X |
| 2,882,455 | 4/1959 | Ferguson | 70—393 X |
| 3,086,109 | 4/1963 | Kaehms | 317—146 X |
| 3,093,994 | 6/1963 | Richard. | |

MILTON O. HIRSHFIELD, *Primary Examiner.*

L. T. HIX, *Examiner.*